US007486049B2

(12) United States Patent
Wan

(10) Patent No.: US 7,486,049 B2
(45) Date of Patent: Feb. 3, 2009

(54) PROTECTION CIRCUIT FOR LITHIUM BATTERY PACK SERVING AS TOOL POWER SOURCE

(76) Inventor: Wei-Liang Wan, No. 6, Lane 539, Longhua Rd., Longtan Township, Taoyuan County 325 (TW)

( * ) Notice: Subject to any disclaimer, the term of this patent is extended or adjusted under 35 U.S.C. 154(b) by 327 days.

(21) Appl. No.: 11/549,123

(22) Filed: Oct. 13, 2006

(65) Prior Publication Data
US 2008/0088280 A1 Apr. 17, 2008

(51) Int. Cl.
H02J 7/00 (2006.01)
(52) U.S. Cl. .................................. 320/134; 361/93.1
(58) Field of Classification Search ......... 320/134–136; 361/93.1
See application file for complete search history.

(56) References Cited

U.S. PATENT DOCUMENTS 6,577,883 B1 * 6/2003 Ueda ........................... 455/573
2005/0088147 A1 * 4/2005 Svensson et al. ............ 320/134
2005/0134227 A1 * 6/2005 Wozniak ..................... 320/134
2005/0242779 A1 * 11/2005 Yoshio ....................... 320/134

* cited by examiner

Primary Examiner—Adolf Berhane
Assistant Examiner—Samuel Berhanu
(74) Attorney, Agent, or Firm—Leong C. Lei

(57) ABSTRACT

A protection circuit for a lithium battery pack that serves as a power source of a power tool is arranged in the lithium battery pack and connected among a reversal/forward rotation circuit, a speed variation circuit, and a motor of the power tool. During a discharging process, the protection circuit detects battery voltage and temperature and when abnormal events occur, the protection circuit cuts off the discharge current. The protection circuit has a simple structure, low costs, and is easy to incorporate to the currently existing pressing-control circuit of the power tool.

6 Claims, 4 Drawing Sheets

US 7,486,049 B2

PROTECTION CIRCUIT FOR LITHIUM BATTERY PACK SERVING AS TOOL POWER SOURCE

BACKGROUND OF THE INVENTION (a) Technical Field of the Invention

The present invention relates generally to a protection circuit for a lithium battery pack that serves as a power source of a power tool, and in particular to a battery protection circuit that, as compared to the conventional battery protection circuit, features simple structure, low costs, being easy to match currently existing depressing-controlled circuit of power tools, and functions detect battery voltage and temperature in the discharging process of the battery for immediately cutting off the discharge current when abnormal events occur.

(b) Description of the Prior Art

Lithium ion batteries, lithium polymer batteries, and other lithium based chemical cells have generally different discharging characteristics from other types of secondary cells. The lithium based batteries or cells are easily subject to damage when they are over-discharged or being of over-temperature. Further, over-temperature may also cause explosion of the lithium based batteries, especially when a number of lithium batteries are connected in series and/or in parallel to effect high current charging and discharging for power tools that requires much larger output power than a single cell can provide. In such applications, the lithium batteries are much more easily subject to damages caused by over-discharging and the costs are much higher when the batteries are so damaged. Also, explosion of the batteries is more powerful, if it happens. Apparently, a protection circuit is often employed to detect voltage and temperature of the lithium battery during the operation thereof and to immediately cut off the discharge current at the time when abnormal events occur. Such a protection circuit must also ensure little leakage current when a power tool having such as protection circuit is put in non-operation condition. However, when a protection circuit is incorporated in a battery pack, it often mismatches a reversal/forward rotation circuit and a speed variation circuit that are commonly present in the power tool.

A regular nickel-cadmium battery or nickel-metal-hydride battery is taken as an example to explain the circuit of a power tool that is a combination of a reversal/forward rotation circuit, a speed variation circuit, and a motor of the power tool, and the battery. FIG. 1 of the attached drawings illustrate the example circuit, which comprises a reversal/forward rotation circuit 10 having a pair of single-pole-double-throw switches 11, 12, which include externally-located control members for switching the switches 11, 12. The two throw terminals of the two switches 11, 12 are coupled to each other respectively and are connected to terminals of a motor 30 respectively. A common terminal of the single-pole-double-throw switch 11 is connected to an anode of a battery 40, while a common terminal of the single-pole-double-throw switch 12 is connected to a third throw terminal of a single-pole-triple-throw switch 21 that constitutes in part a speed variation circuit 20.

Besides the single-pole-triple-throw switch 21, the speed variation circuit 20 also comprises a pulse width modulation (PWM) generation circuit 22, a power transistor 23, a switch 24 that is closed by the switching operation of the single-pole-triple-throw switch 21, and a diode 25. The switch 21 has a common terminal connected to a cathode of the battery 40, a first throw terminal that is open-circuited, and a second throw terminal that is connected to a grounding terminal of the PWM generation circuit 22 and also connected to an emitter of the power transistor 23. The third throw terminal, which as mentioned above, is connected to the common terminal of the single-pole-double-throw switch 12. The PWM generation circuit 22 has an input terminal that is connected to the anode of the battery 40 and an output terminal connected to a base of the power transistor 23. A collector of the power transistor 23 is connected to the third throw terminal of the switch 21. The switch 24 has a terminal connected to the anode of the battery 40 and an opposite terminal connected to the third throw terminal of the switch 21 so that the switch 24 is induced to close by the operation of switching the switch 21 to the first throw terminal. The diode 25 has a negative terminal connected to the anode of the battery 40, and a positive terminal connected to the third throw terminal of the switch 21.

When an operation button or actuation button is manually depressed, the switch 21 is driven away from the first throw terminal and thus opening the switch 24. When the switch 21 reaches the second throw terminal thereof, the emitter of the power transistor 23 is put in electrical connection with the cathode of the battery 40 and the PWM generation circuit 22 is actuated to supply a PWM signal from the output terminal thereof to the base of the power transistor 23. The tool operation button, when depressed or actuated, varies a variable resistor, in such a way that the extent that the operation button is depressed corresponds to the PWM signal ratio, and thus, the rotational speed and output torque of the motor 30 are increased in accordance therewith. When the operation button is depressed to the bottom most position, the switch 21 is driven to the third throw terminal and the power transistor 23 is bypassed. In this condition, the motor 30 is directly driven by the closed third throw terminal of the switch 21. When the operation button is no longer depressed and is thus released, the switch 21 is biased back to the first throw terminal and power supplied to the motor 30 is cut off and the switch 24 is controlled by such a backward switching operation to close, which applies a positive voltage from the battery 40 to both terminals of the motor 30 and thus inducing braking operation of the motor 30. This stops the operation of the motor 30. Further, since, in this situation, the switch 21 breaks the connection between the cathode of the battery 40 and the power transistor 23 and the grounding terminal of the PWM generation circuit 22, the leakage current is reduced.

As shown in FIG. 2, by incorporating the above discussed reversal/forward rotation circuit 10 and the speed variation circuit 20 in a power tool that is powered by a lithium battery pack 70, together with a protection circuit 50 arranged within the battery pack 70, to effect cutting off the discharge current at the time when abnormal events occur, a discharge circuit of a lithium battery set 71, which is a circuit that is in connection with the previously discussed switch 21, must be connected in series with a power transistor MOS1. Such an arrangement, when incorporated to the reversal/forward rotation circuit 10 and the speed variation circuit 20, raises a problem where the power supplied to the PWM generation circuit 22 will be cut off by the power transistor MOS1 and the PWM generation circuit 22 fails to properly function.

An example solution to such a problem is illustrated in FIG. 3, wherein the lithium battery pack 70 is further provided with two transmission lines, of which one is branched off the connection between the cathode of the lithium battery pack 71 and the speed variation circuit 20, which line forms a terminal that provides an electrical signal labeled V-, the power transistor MOS1 being arranged on the line, and the other line is coming from a terminal of the protection circuit 50 that receives a positive electrical signal labeled VDD, a switch 51 being arranged on the line. If necessary, a temperature detection terminal Vth can be further added for detecting the temperature during a charging process. When the switch 21 is slightly depressed, the switch 51 is closed to provide VDD to drive the protection circuit 50 and conducting on the power transistor MOS1 to have the common terminal of the switch 21 connected to the anode of the battery pack 70 to thereby form an operation circuit.

The known circuit, however, suffers insufficient space inside a power tool for arrangement of the switching circuit. In other words, the power tool has to be redesigned with an increased size. In addition, two power transistors connected in series make efficiency low and costs increased.

The present invention is aimed to solve the drawbacks of the conventional protection circuit employed in power tool that uses a lithium battery pack as a power source.

SUMMARY OF THE INVENTION

The primary purpose of the present invention is to provide a protection circuit for a lithium battery pack that serves as a power source of a power tool to solve the above discussed drawbacks and being simple in construction with low costs and being easy to incorporate a reversal/forward rotation circuit and a speed variation circuit.

To achieve the above objective, in accordance with the present invention, a protection circuit for a lithium battery pack that serves as a power source of a power tool is provided, which is arranged in the lithium battery pack and is connected among a reversal/forward rotation circuit, a speed variation circuit, and a motor of the power tool. During a discharging process, the protection circuit detects battery voltage and temperature and when abnormal events occur, the protection circuit cuts off the discharge current. The protection circuit has a simple structure, low costs, and is easy to incorporate to the currently existing pressing-control circuit of the power tool.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
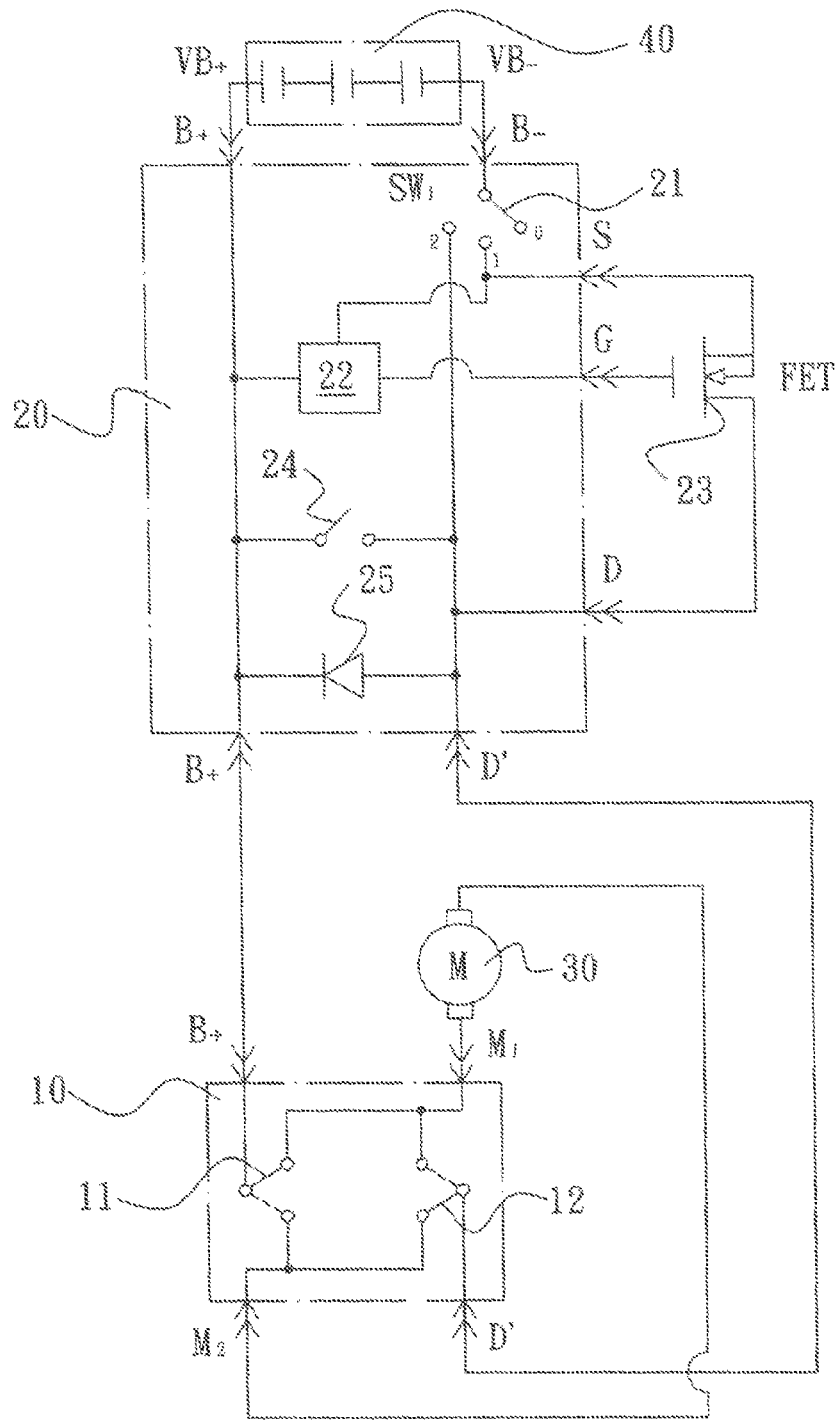
FIG. 1 is a conventional circuit diagram illustrating the combination of a reversal/forward rotation circuit, a speed variation circuit, a motor, and a battery for a power tool powered by a nickel-cadmium battery on a nickel-metal-hydride battery.
Figure 2:
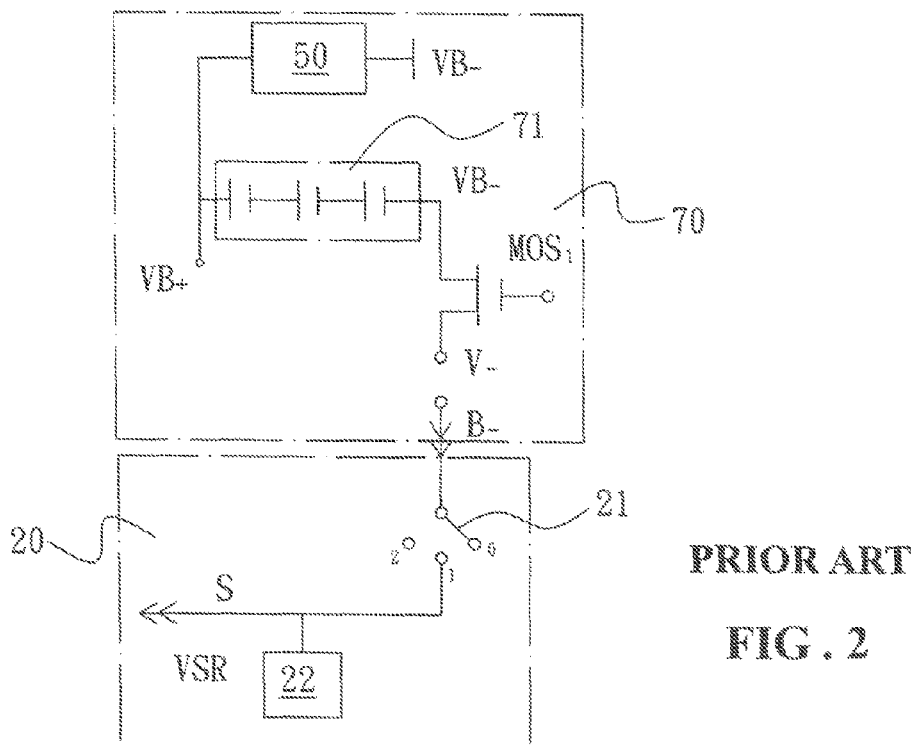
FIG. 2 is a unworkable arrangement of circuit corresponding to that shown in FIG. 1 with the battery being replaced by a lithium battery pack and incorporating a battery protection circuit therein.
Figure 3:
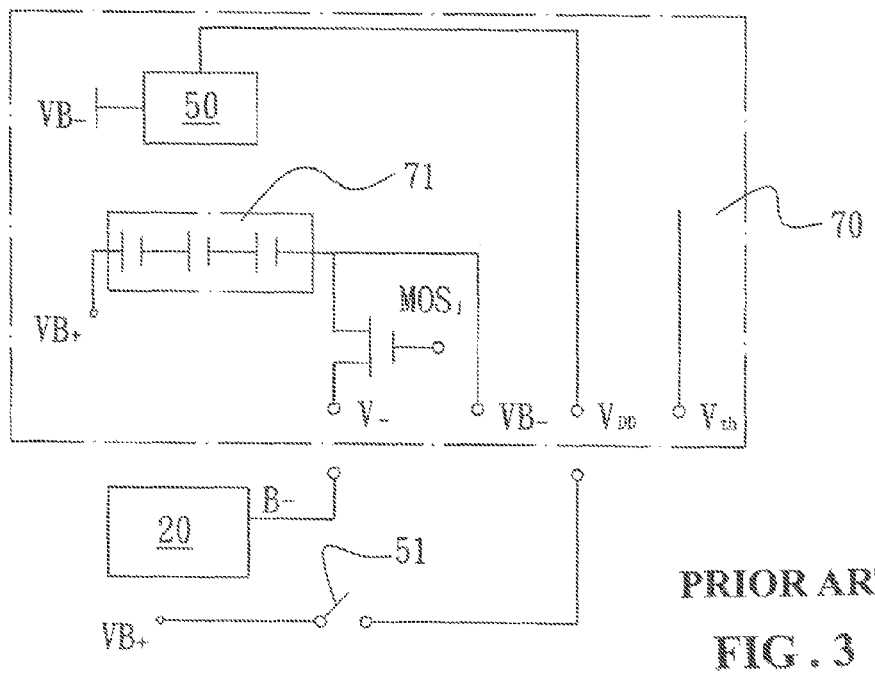
FIG. 3 is a not-working-well arrangement of circuit corresponding to that shown in FIG. 1 with the battery being replaced by a lithium battery pack and incorporating a battery protection circuit therein.
Figure 4:
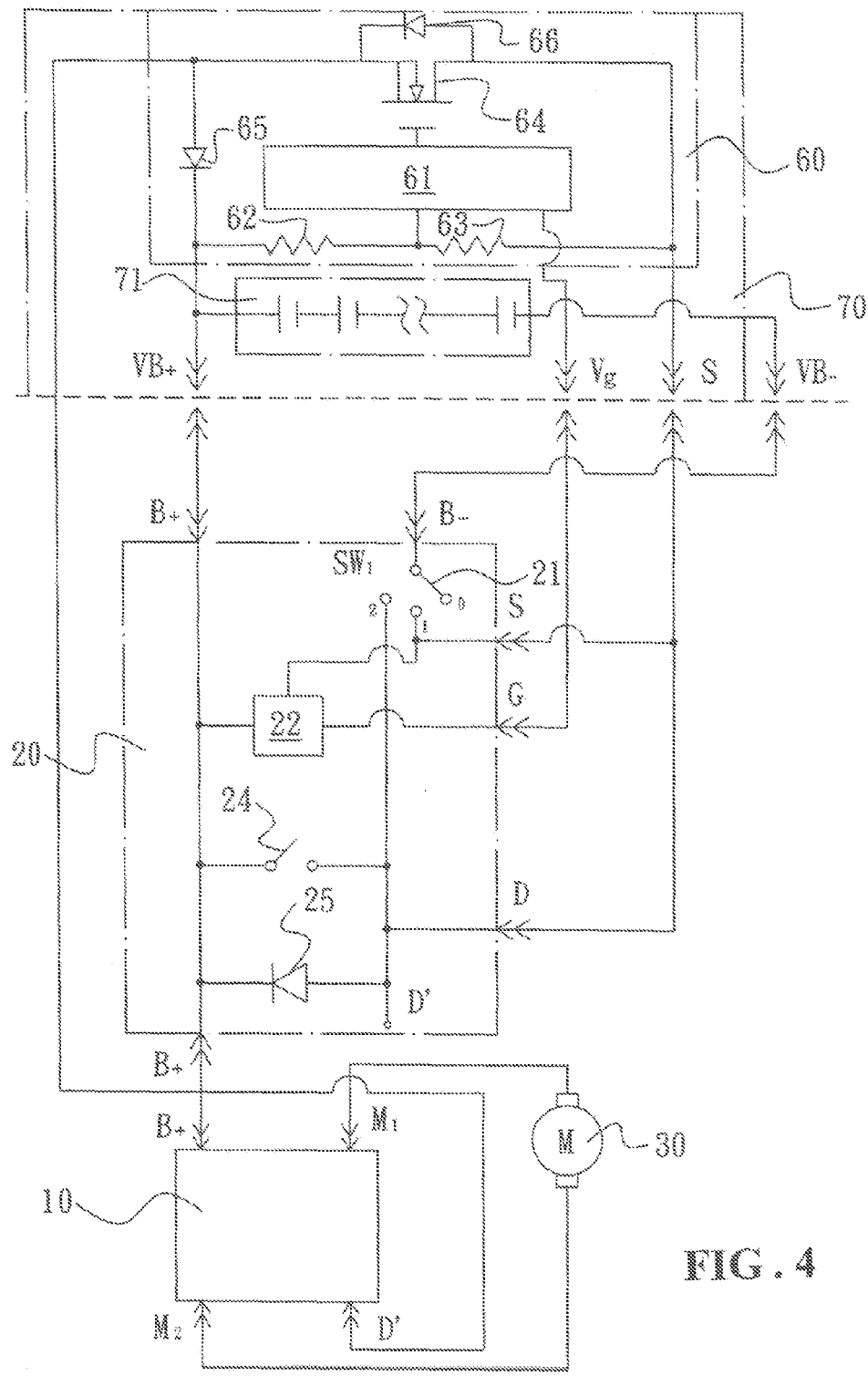
FIG. 4 is a circuit diagram of a protection circuit in accordance with the present invention for protecting a lithium battery pack that powers a power tool.

With reference to the drawings and in particular to FIG. 4, which illustrates a circuit diagram of a protection circuit in accordance with the present invention for protecting a lithium battery pack, generally designated 70, that powers a power tool, the protection circuit, generally designated with reference numeral 60, comprises an abnormality control integrated circuit (IC) 61, a first resistor 62, a second resistor 63, a power transistor 64, a first diode 65, and a second diode 66. A power input terminal of the abnormality control IC 61 is connected to an anode of a lithium battery set 71 that constitutes the battery pack 70, and is connected to a first detection terminal thereof via the first resistor 62. The first detection terminal is also connected via the second resistor 63 to a negative terminal of the protection circuit 60, which is further connected to an emitter terminal of the power transistor 64. The power transistor 64 also has a base terminal that is connected to an output control terminal of the abnormality control IC 61, and a collector terminal connected through the first diode 65 to the anode of the lithium battery set 71. The second diode 66 is arranged between the emitter and collector of the power transistor 64. The connection of a reversal/forward rotation circuit 10, which originally constitutes in part a control circuit of the power tool, with a corresponding throw terminal (the third throw terminal) of a single-pole-tripethrow switch 21 of a speed variation circuit 20, which is also parts of the control circuit of the power tool, is, in accordance with the present invention, switched to connect to the collector of the power transistor 64. The abnormality control IC 61 also has a second detection terminal that is connected to a corresponding terminal of a PWM generation circuit 22 that constitutes in part the speed variation circuit 20 of the power tool. The negative terminal of the protection circuit 60 is connected to second and third throw terminals of the single-pole-triple-throw switch 21 of the speed variation circuit 20. Consequently, the power transistor 23 that constitutes in part the conventional speed variation circuit 20 is not omitted.

As a consequence of the above described arrangement, the power transistor 64 and the first diode 65 function to supply power to the motor 30; the abnormality control IC 61 detects battery voltage of the lithium battery set 71, switching status, and temperature of the battery and controls the operation of the motor 30; and a voltage division circuit constituted by the first and second resistors 62, 63 provides a signal indicating battery voltage (alternatively, each circuit detecting each single cell). The operation of the circuit will be described as follows:

(1) When the power tool is not in operation, and the single-pole-triple-throw switch 21 is not depressed or actuated, the grounding line of the protection circuit 60 and the cathode of the lithium battery set 71 are separated, namely open-circuited, so that the leakage current is extremely small.

(2) When the operation button of the power tool is moderately depressed, the single-pole-triple-throw switch 21 is moved to the second throw position where the grounding terminal of the protection circuit 70 is connected to the cathode of the lithium battery set 71 for operation.

(3) The abnormality control IC 61 detects the battery voltage through the first detection terminal thereof, and detects the position of the switch 21 by the second detection terminal and conducts the power transistor 64 on through the output control terminal thereof.

(4) At the time when the operation button of the power tool is moderately depressed to move the single-pole-triple-throw switch 21 to the second position, the PWM generation circuit 22 generates and applies a PWM signal to the abnormality control IC 61 through the second detection terminal and the abnormality control IC 61 conveys the PWM signal, in the same phase, through the output control terminal thereof to conduct the power transistor 64 on/off for driving the motor 30.

(5) The extent that the single-pole-triple-throw switch 21 is depressed corresponds to the conduction ratio (or ratio of working duration) of the PWM signal, which indirectly corresponds to the output power of the motor 30.

(6) When the single-pole-triple-throw switch 21 is depressed to the bottommost position, which corresponds to the third throw position, due to the fact that the second and third throw terminals of the single-pole-triple-throw switch 21 are shorted with each other, the power supply through the protection circuit 60 is not altered. The conventional drawback that when the conventional switch 21 is depressed to the bottommost position, the PWM signal cannot effect full-cycle conduction-on can be overcome by a single-chip processor of the abnormality control IC 61 where a built-in program detects the movement of the switch 21 to the bottommost position, and conducts the power transistor 64 on.

(7) When the switch 21 is no longer depressed and released, the power transistor 64 is switched from a full-cycle conduction-on condition back to a pulse width modulating condition. Once the switch 21 returns back to the original position, namely the first throw position, the grounding terminal of the protection circuit is separated from the cathode of the lithium battery set 71 and is connected to the anode of the lithium battery set 71 through the switch 24 of the speed variation circuit 20 that is originally present in the power tool. This, under the protection secured by the second diode 66 connected across the power transistor 64, supplies positive voltage to both terminals of the motor 30 and thus inducing braking on the motor 30.

(8) In charging the lithium battery pack 70, the connection of the reversal/forward rotation circuit 10 that is originally present in the power tool with the corresponding terminal of the single-pole-triple-throw switch 21 of the speed variation circuit 20 is not coupled to a charger circuit, while the connection of the protection circuit 60 to the reversal/forward rotation circuit 10 and the speed variation circuit 20 are coupled to the charger circuit so that when the power tool is connected to a charger, the grounding terminal of the protection circuit 60 is connected to a grounding terminal of the charging power source and the second detection terminal serves as input/output means for the charger.

Figure 5:
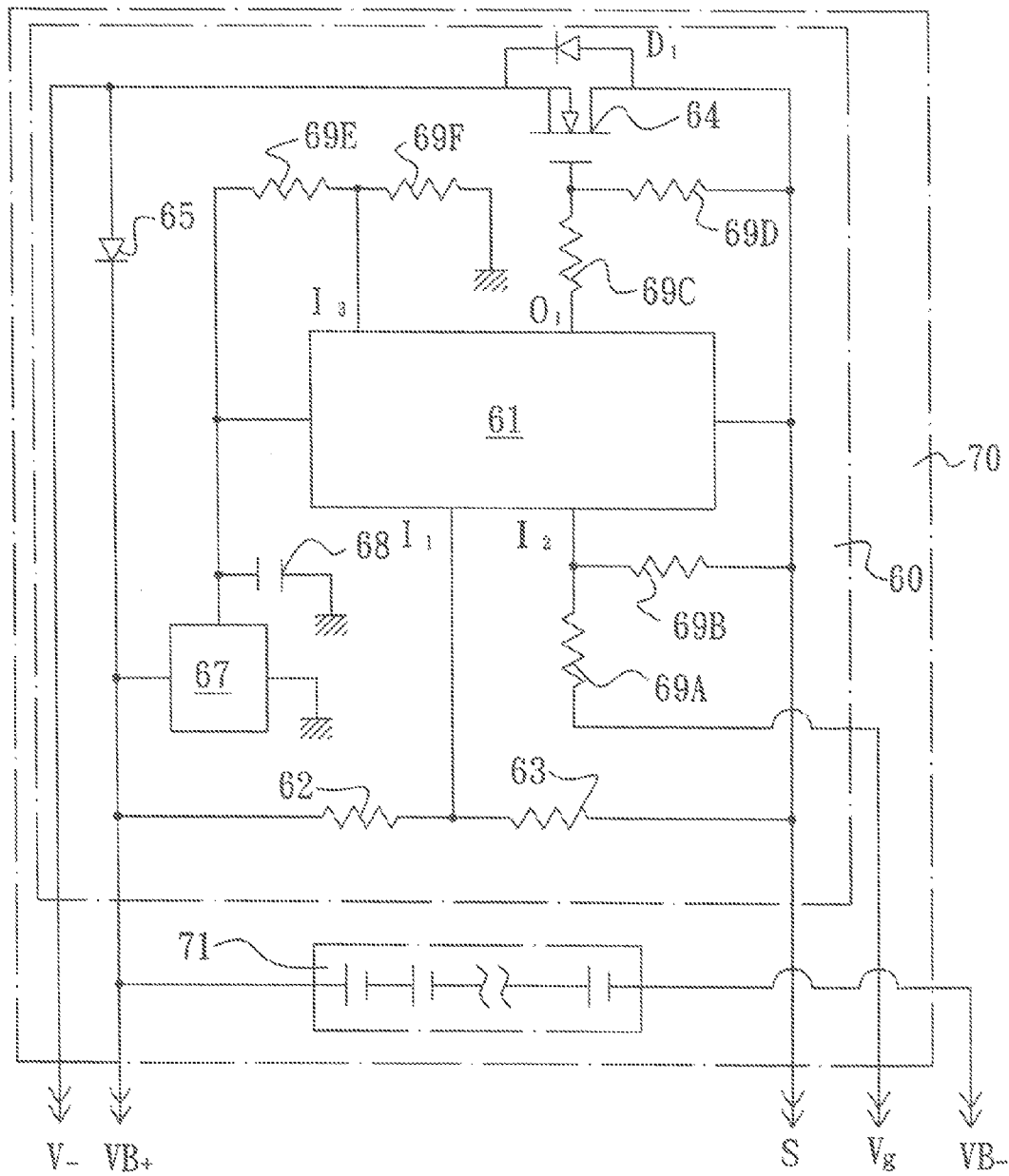
FIG. 5 is a circuit diagram of another embodiment of a battery protection circuit in accordance with the present invention.

The protection circuit for lithium battery pack that serves as a power source of a power tool can be embodied in another manner, which is illustrated in FIG. 5. The circuit shown in FIG. 5 is substantially the same as the counterpart circuit shown in FIG. 4 with additional components, including voltage regulation IC 67, a capacitor 68, a third resistor 69A, a fourth resistor 69B, a fifth resistor 69C, a sixth resistor 69D, a seventh resistor 69E, and a temperature sensing resistor 69F. The anode of the lithium battery set 71 is connected to the IC 67, which can be for example IC 7805, and further connected, through an operation terminal of the IC 67, to the power terminal of the abnormality control IC 61. The operation terminal of the IC 67 is also grounded through the capacitor 68 and is additionally grounded through the seventh resistor 69E that is in series connection with the temperature sensing resistor 69F. A node point between the seventh resistor 69E and the temperature sensing resistor 69F is connected to a third detection terminal of the IC 61. The second detection terminal of the IC 61 is connected in series with the third resistor 69A and then connected to the PWM generation circuit 22 shown in FIG. 4. The second detection terminal is also connected through the fourth resistor 69B to the ground. The fifth resistor 69C is connected between the base of the power transistor 64 and the output control terminal of the IC 61. The base of the power transistor 64 is also connected through the sixth resistor 69D to the grounding terminal of the IC 61.

It is apparent from the above description that the protection circuit for a lithium battery that serves as a power source for a power tool can effectively cut off discharge current to protect the battery when over-temperature occurs in a charging and/or discharging process. Thus, the charging process can be controlled at the optimum condition for each lithium battery, ensuring that none of the lithium battery in a battery pack will be over-discharged to exceed a preset lower limit and also allowing a battery pack constituted by serially-connected batteries to be charged with the maximum current. Consequently, the battery pack can be of extended service life and short charging time.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A protection circuit for a lithium battery pack serving as a power source of a power tool, adapted to connect to a reversal/forward rotation circuit, a speed variation circuit, and a motor of the power tool, comprising: an abnormality control integrated circuit, a first resistor, a second resistor, a power transistor, a first diode, and a second diode, wherein the abnormality control integrated circuit has a power terminal connected to an anode of a lithium battery set constituting in part the battery pack, and connected to a first detection terminal of the abnormality control integrated circuit via the first resistor, the first detection terminal being also connected via the second resistor to a negative terminal of the protection circuit, which is further connected to an emitter terminal of the power transistor, the power transistor having a base terminal connected to an output control terminal of the abnormality control integrated circuit, a collector terminal of the abnormality control integrated circuit being connected through the first diode to the anode of the lithium battery set, the second diode being arranged between the emitter and collector of the power transistor, the collector of the power transistor being connected to corresponding throw terminal of a single-pole-tripe-throw switch constituting in part the speed variation circuit of power tool, the abnormality control integrated circuit also having a second detection terminal connected to a pulse width modulation generation circuit that constitutes in part the speed variation circuit of the power tool, the grounding terminal of the protection circuit being connected to second and third throw positions of the single-pole-triple-throw switch of the speed variation circuit.

2. The protection circuit as claimed in claim 1, wherein the reversal/forward rotation circuit comprises a pair of single-pole-double-throw switches each having two throw terminals coupled to each other respectively and connected to opposite terminals of the motor respectively, a first one of the two single-pole-double-throw switches having a common terminal connected to the anode of the battery set, a second one of the single-pole-double-throw switches having a common terminal connected to the collector of the power transistor of the protection circuit.

3. The protection circuit as claimed in claim 2, wherein the speed variation circuit further comprises a switch that is controlled to open/close by switching operation of the single-pole-triple-throw switch, and a diode, the single-pole-triple-throw switch having a common terminal connected to a cathode of the battery set, and a first throw position that is open-circuited, the second throw position being connected to a grounding terminal of the pulse width modulation generation circuit and also connected to the grounding terminal of the abnormality control integrated circuit of the protection circuit, the third throw position being connected to the grounding terminal of the abnormality control integrated circuit, the pulse width modulation generation circuit having an input terminal connected to the anode of the battery set and an output terminal connected to the detection terminal of the abnormality control integrated circuit, switch that is controlled to open/close by the switching operation of the single-pole-triple-throw switch having a terminal connected to the anode of the battery set and an opposite terminal connected to the third throw position of the single-pole-triple-throw switch, the switch being controlled to close by the switching operation of the single-pole-triple-throw switch to the first throw position, the diode having a positive terminal connected to the anode of the battery set, and a negative terminal connected to the third throw position of the single-pole-triple-throw switch.

4. A protection circuit for a lithium battery pack serving as a power source of a power tool, adapted to connect to a reversal/forward rotation circuit, a speed variation circuit, and a motor of the power tool, comprising: an abnormality control integrated circuit, a first resistor, a second resistor, a third resistor, a fourth resistor, a fifth resistor, a sixth resistor, a seventh resistor, a temperature sensing resistor, a power transistor, a first diode, a second diode, a voltage regulation integrated circuit, and a capacitor, wherein the abnormality control integrated circuit has a power terminal connected to an operation terminal of the voltage regulation integrated circuit, and further connected, through a power terminal of the voltage regulation integrated circuit, to an anode of a lithium battery set constituting in part the battery pack, the operation terminal of the voltage regulation integrated circuit being grounded through the capacitor and being further grounded through the seventh resistor that is in series connection with the temperature sensing resistor, a node point between the seventh resistor and the temperature sensing resistor being connected to a third detection terminal of the abnormality control integrated circuit, the anode of the lithium battery set being connected to a first detection terminal of the abnormality control integrated circuit via the first resistor, the first detection terminal being also connected via the second resistor to a negative terminal of the protection circuit, which is further connected to an emitter terminal of the power transistor, the power transistor having a base terminal connected to an output control terminal of the abnormality control integrated circuit via the fifth resistor, a collector terminal of the abnormality control integrated circuit being connected through the sixth resistor to the grounding terminal of the abnormality control integrated circuit, the collector of the power transistor being connected through the first diode to the anode of the battery set, the second diode being arranged between the emitter and collector of the power transistor, the collector of the power transistor being connected to corresponding throw terminal of a single-pole-tripe-throw switch constituting in part the speed variation circuit of power tool, the abnormality control integrated circuit also having a second detection terminal connected through the third resistor to a pulse width modulation generation circuit that constitutes in part the speed variation circuit of the power tool, the second detection terminal being also connected to the grounding terminal of the abnormality control integrated circuit through the fourth resistor, the grounding terminal of the abnormality control integrated circuit being the same as the grounding terminal of the protection circuit connected to second and third throw positions of the single-pole-triple-throw switch of the speed variation circuit.

5. The protection circuit as claimed in claim 4, wherein the reversal/forward rotation circuit comprises a pair of single-pole-double-throw switches each having two throw terminals coupled to each other respectively and connected to opposite terminals of the motor respectively, a first one of the two single-pole-double-throw switches having a common terminal connected to the anode of the battery set, a second one of the single-pole-double-throw switches having a common terminal connected to the collector of the power transistor of the protection circuit.

6. The protection circuit as claimed in claim 5, wherein the speed variation circuit further comprises a switch that is controlled to open/close by switching operation of the single-pole-triple-throw switch, and a diode, the single-pole-triple-throw switch having a common terminal connected to a cathode of the battery set, and a first throw position that is open-circuited, the second throw position being connected to a grounding terminal of the pulse width modulation generation circuit and also connected to the grounding terminal of the abnormality control integrated circuit of the protection circuit, the third throw position being connected to the grounding terminal of the abnormality control integrated circuit, the pulse width modulation generation circuit having an input terminal connected to the anode of the battery set and an output terminal connected to the detection terminal of the abnormality control integrated circuit, switch that is controlled to open/close by the switching operation of the single-pole-triple-throw switch having a terminal connected to the anode of the battery set and an opposite terminal connected to the third throw position of the single-pole-triple-throw switch, the switch being controlled to close by the switching operation of the single-pole-triple-throw switch to the first throw position, the diode having a positive terminal connected to the anode of the battery set, and a negative terminal connected to the third throw position of the single-pole-triple-throw switch.

* * * * *